June 7, 1960 R. BIRMANN 2,939,626
TURBO-COMPRESSOR
Filed Dec. 27, 1957 4 Sheets-Sheet 1

INVENTOR.
RUDOLPH BIRMANN
ATTORNEYS

INVENTOR.
RUDOLPH BIRMANN
ATTORNEYS

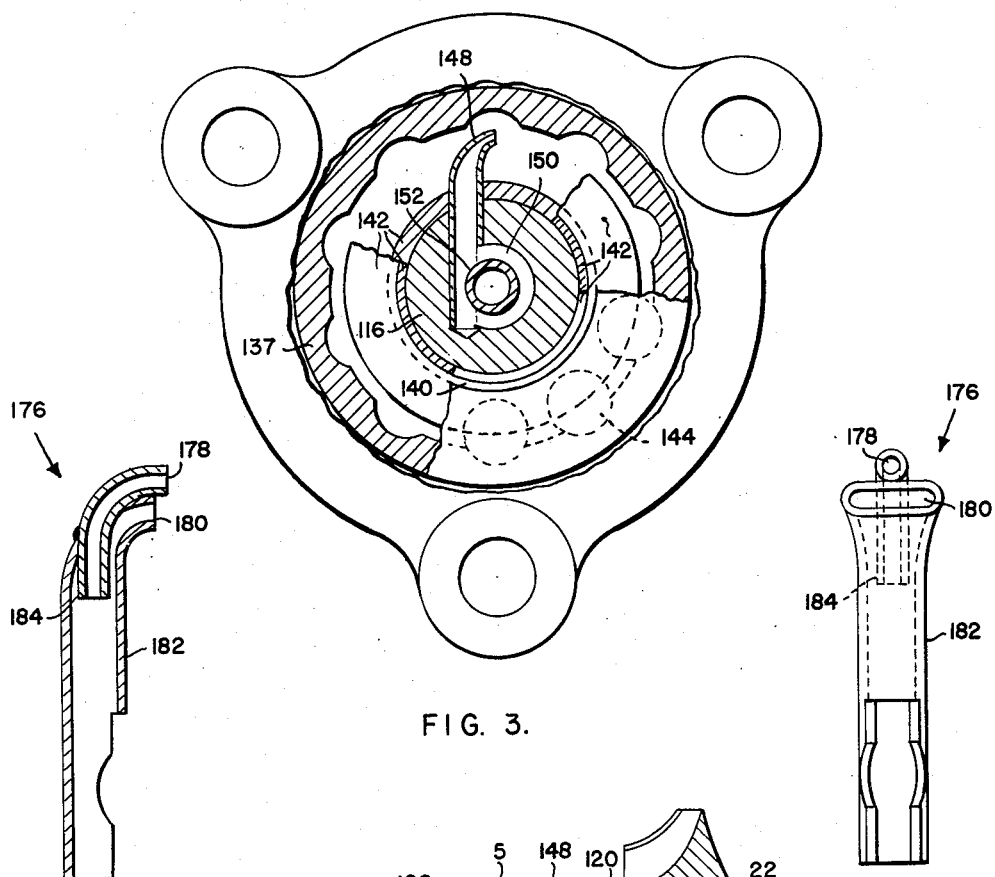
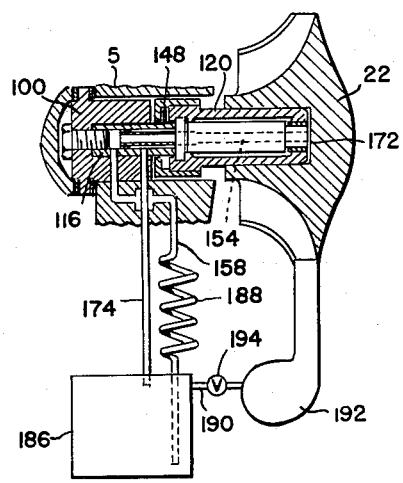

INVENTOR.
RUDOLPH BIRMANN
BY
ATTORNEYS

United States Patent Office 2,939,626
Patented June 7, 1960

2,939,626

TURBO-COMPRESSOR

Rudolph Birmann, Newtown, Pa., assignor to De Laval Steam Turbine Company, Trenton, N.J., a corporation of New Jersey Filed Dec. 27, 1957, Ser. No. 705,620

15 Claims. (Cl. 230—116)

This invention relates to turbo-compressors and has particular reference to the mounting of an overhung rotor carrying turbine and compressor blading, and to rotor bearing construction and lubrication therefor.

In particular, in accordance with the invention, there is provided an anti-friction bearing mounting for such a rotor having various desirable characteristics as follows:

The rotor is supported practically at its center of gravity, the rotor desirably having located within its body at least a part of a bearing which is mounted externally to a fixed (though slightly displaceable) shaft.

For any shaft proportions dictated by the necessity of obtaining the proper vibratory shaft frequencies and not exceeding allowable shaft deflections, all linear speeds of the anti-friction bearing (pitch line speeds, race speeds, etc.) are the minimum and can be held within conventional satisfactory limits in spite of unconventionally high rotational speeds of the rotor. In typical arrangements, for example, the rotor may operate at speeds of the order of 60,000 to 110,000 r.p.m.

The mounting of the rotor is at a point where its temperature is the minimum, approximating ambient atmospheric temperature and the mounting is such that heat flow from the hot portions of the rotor to the bearing by radiation and convection is minimized.

Further in accordance with the invention, there is provided a floating bearing mounting designed to eliminate the deleterious effect of critical speeds, for which purpose it combines, in proper proportions, radial elasticity and damping. Furthermore, it permits full control of radial displacement both with regard to magnitude and with regard to continued parallelism of the rotor axis. This latter is a particularly important feature which has not previously been accomplished with overhung rotors. In the past, elastic deflection of the bearing mountings of such rotors was associated with tilting of the rotor axis, giving rise to gyroscopic disturbances.

In the high speed operation experienced in turbo-rotors ball bearing assemblies must be extremely accurate, and minute particles of dust or minute burrs on the bearing parts, as well as the slightest departure from optimum clearances, can give rise to bearing failures resulting in destruction of the turbo-compressor. For ultra high speed service, sleeve bearings are generally more desirable and are not as sensitive to foreign matter and minor dimensional inaccuracies as are ball bearings.

Involved in the use of sleeve bearings in place of ball bearings are the following considerations:

A suitable sleeve bearing must be provided at reasonable manufacturing cost and having structural simplicity comparable with ball bearing mountings.

The sleeve bearing assembly must operate satisfactorily without oil leakage in either horizontal or vertical installations, and, where vertical, with the rotor either above or beneath the bearing.

Lubrication must be achieved either by the use of engine oil or by means of a self-contained lubricating system without the use of complicated auxiliary apparatus such as an oil supply pump, a scavenging pump and the like. Friction losses must be very small and comparable to those of ball bearings.

It is a further object of the present invention to provide a sleeve bearing construction which will satisfy the foregoing requirements.

The foregoing objects of the invention and other objects of the invention relating particularly to details of construction and operation thereof will become apparent from the following description when read in conjunction with the accompanying drawings, in which:

Figure 3 is a transverse section taken on the trace 3—3 shown in Figure 2;

Figure 4 is an enlarged sectional showing of a modified form of a portion of the apparatus shown in Figures 2 and 3;

Figure 5 is a side elevation of the part shown in Figure 4;

Figure 6 is a diagrammatic representation of a self-contained lubricating system applied to the form of the invention shown in Figure 2;

The turbo-compressor illustrated and described herein is designed for charging use in association with an internal combustion engine which may be either of diesel or spark ignition type. The turbine of the turbo-compressor is driven by the engine exhaust and the compressor provides air for charging and, in the case of a two-cycle engine, for scavenging.

Figure 1:
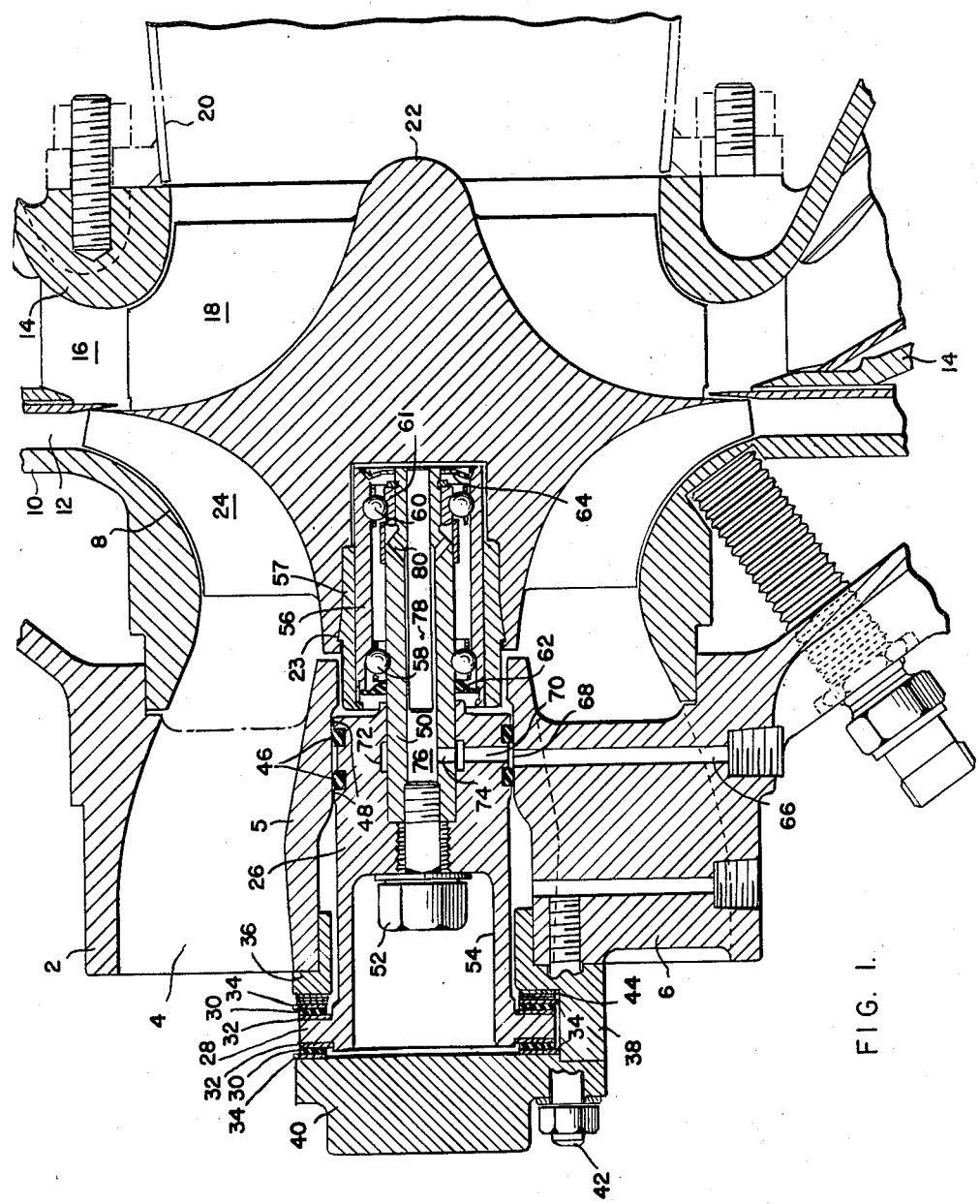
Figure 1 is a fragmentary axial section taken through a turbo-compressor showing rotor bearing details, the bearing being of ball type.

Referring to Figure 1, the compressor portion of a housing is indicated generally at 2 and is provided with an air intake opening 4 in the central portion of which there is axially located a housing 5 for the mounting of a shaft arrangement, this latter housing being supported within the opening 4 by streamlined struts 6 between which the air flow takes place through the intake opening 4. The housing 2 is formed at 8 to provide an outer wall for compressor passages and at 10 is provided with a substantially radial wall forming one boundary of a vaneless diffuser passage 12 which discharges into a compressor scroll surrounding the rotor axis and not shown in the drawing.

A turbine housing 14 is mounted in rigid association with the compressor housing 2 by means not shown in the drawing and provides for a vortex flow of driving gas in the region 16 and directed inwardly to enter turbine blades 18 and to be discharged therefrom through an exhaust diffuser 20.

The turbo-compressor rotor 22 mounts the turbine blades 18 and the compressor blades 24. The details of the turbo-compressor structure and operation are more fully described and claimed in my application Serial No. 530,966, filed August 29, 1955.

The improved mounting for the turbo-compressor rotor will now be described. A bearing bracket 26 extends within the housing 5 and is provided at its left-hand or outer end, as viewed in Figure 1, with a radially outwardly extending flange 28. On each side of the flange 28 there is positioned an annular sandwich arrangement each comprising a rubber washer 30 vulcanized to a steel washer 32 on one side and a steel washer 34 on the other side. The radially inner surfaces of the steel washers 32 bear against the outer surfaces of cylindrical shoulders adjoining the radial flange 28. An annular retainer 38 is mounted internally of the left-hand end of the housing 5 and is provided with a radially extending flange 36. Spacer shims 44 are positioned between the adjacent steel washer 34 and the face of the flange 36. A clamp cap 40 is drawn by means of an annular array of nut and bolt arrangements 42 toward the housing 5 so as to compress the rubber washers 30 in an axial direction. A positive seating is provided for the cap 40 against the annular retainer 38 and the shim washers 44 are provided to adjust the degree of compression on the rubber washers 30. The radially outer surfaces of the steel washers 34 seat against the radially inner surface of the retainer 38. The inner surfaces of the washers 34 are spaced from the bracket 26 and the outer surfaces of the washers 32 are spaced from the retainer 38. This arrangement permits relative radial motion between the bracket 26 and the retainer 38 by the rubber washer working in shear but prevents any appreciable relative longitudinal motion between these parts due to the longitudinal pre-compression of the rubber washers.

The right-hand end of the bearing bracket 26 is supported by a pair of rubber O-rings 46 within the housing 5 and circumferentially extending shoulders 48 are provided on the bearing bracket 26 in slightly spaced relation with the inner wall of the housing 5.

From the foregoing it will be evident that the bearing bracket 26 is suspended by the rubber washers 30 in shear and given additional support by the O-rings 46. Thus the bearing bracket is free to float, within limits, in such a fashion that there is substantially no tilting and that the center line of the rotor will remain parallel with the longitudinal axis of the turbo-compressor housing. This type of movement arises due to the fact that the thin rubber washers, if they are suitably pre-compressed in the axial direction, can allow a relatively large shear deflection in a radial direction with practically no displacement perpendicular to the direction of shear forces. Excessive radial deflection is limited by the annular shoulders 48 which, upon excessive deflection, will bear against the housing 5 following the necessary compression of the O-rings 46, which are pre-compressed at the time of assembly of the parts.

An inner bearing sleeve 50 is press fit into a longitudinally extending bore in the bearing bracket 26 and is held in position therein by means of a bolt 52 having its head bearing against a flange provided by the enlarged bore portion 54 of the left-hand end of the bearing bracket 26. An outer bearing member 56 rotates on balls 58 and 60. Balls 58 roll in a race ground directly into the inner bearing sleeve 50, whereas balls 60 roll in a separate inner race 61 mounted on the inboard or right-hand end of the inner bearing sleeve 50. Closure members 62 and 64 serve to effect substantial sealing of the ball bearing assembly. The row of balls 60 of the inboard bearing is positioned as closely as possible to the center of gravity of the rotor 22.

In order to mount the high speed rotor 22 on the outer bearing member 56 so that it is free to expand under conditions of high temperature and stress while at the same time preserving complete concentricity with the outer bearing member, a bushing 57 is fitted into the rotor bore. The bushing 57 has, locally, a slightly tapered external surface 23, approximately midway between the ball rows 58 and 60. By pressing the bushing 57 into the rotor 22, while heating the rotor and chilling the bushing, a heavy shrink fit is produced, but only locally in the vicinity of the tapered surface 23. This heavy shrink fit results, at rotor standstill, in circumferential tension stresses in the external outboard end of the rotor hub, and at the same time, circumferential compression stresses in the middle of the bushing 57. It should be noted that the bushing remains unstressed at both ends. During operation of the rotor at high rotational speeds the rotor expands and thus somewhat relieves the local compression stresses in the middle of bushing 57, and thus the middle portion of the bushing follows the rotor expansion brought about by high temperatures and centrifugal stresses, whereas the ends of the bushings that have not been pre-stressed remain in intimate contact with the outer bearing member 56. It is clear, therefore, that this intimate contact assures perfect concentricity between rotor 22 and the outer bearing member 56, under all conditions of differential expansion.

For the purpose of lubricating the bearing assembly, an oil mist is introduced through the opening 66 in the strut 6 and passes therefrom through the annular space 68 between the housing 5 and the bearing bracket 26 to radial bores 70 in the bearing bracket from which the mist flows through an annular groove 72 in the bearing bracket and radial bores 74 in the bearing sleeve 50 to the longitudinally extending axial bore 76 within the bearing sleeve 50. In the bore 76 the oil mist flows through the annular space surrounding the extended plug 78 which is fitted into the reduced diameter right-hand end of the bore 76 and thereafter the oil mist flows through the bores 80 in the bearing sleeve 50 to the interior of the bearing assembly. The plug 78 is made of copper. It is cooled by the flow of oil mist and it acts to withdraw heat from the inner race 61 of the row of balls 60. The oil mist circulates through the interior of the bearing assembly, finally emerging at the outboard end of the assembly where the closure member 62, which, unlike the closure member 64, is made of rubber, deflects into a conical configuration permitting the oil mist to escape over the outer periphery of the closure member 62 after it has served its function of lubricating both ball bearings.

The rotor mounting structure described and shown in Figure 1 provides not only the desirably located and well lubricated bearing assembly but also provides the floating non-tilting bearing support bracket 26 which, by allowing only shear deflection in the rubber washers 30 limited to movement in a plane radial to the support bracket 26, serves to maintain the center line of the bracket 26, when moved, substantially parallel to the center line of the bracket in its unmoved position. This shear deflection gives rise to an orbit seeking rotor operation in which the rotor rotates around its center of mass thus materially reducing vibration and stress during high speed rotor operation.

Figure 2:
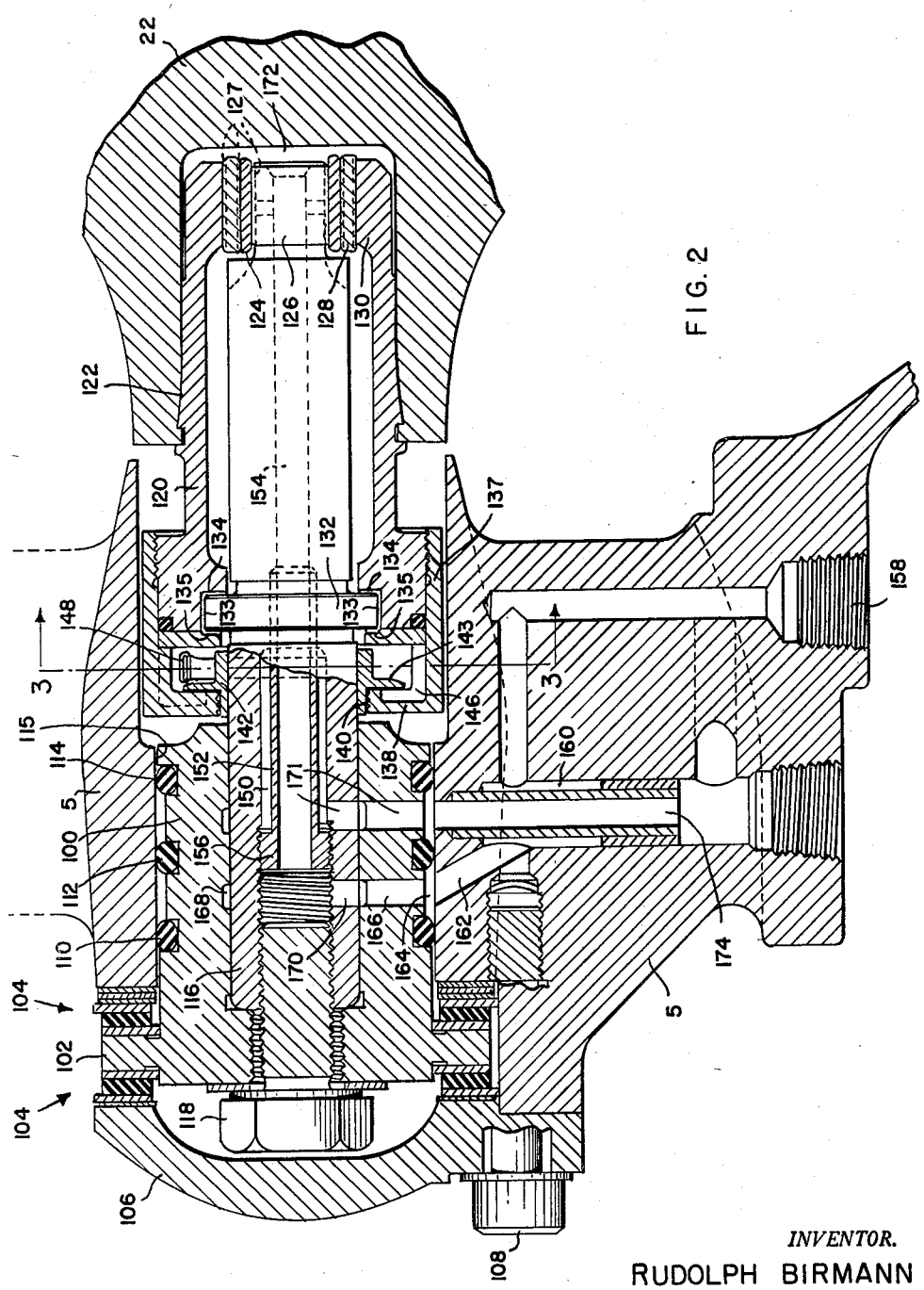
Figure 2 is a fragmentary axial section taken through a turbo-compressor showing a modification of the form of the invention shown in Figure 1, the bearing being of sleeve type.

In Figure 2 there is shown an alternative form of the invention embodying sleeve bearings in place of the ball bearings mounting the rotor shown in Figure 1. In Figure 2 there is shown a housing 5 similar to that shown in connection with Figure 1, within which there is mounted a bearing bracket 100. The left-hand end portion of the bearing bracket 100 is provided with a radially outwardly extending flange 102 positioned between rubber sandwiches indicated generally at 104 which are similar to the elements 30, 32 and 34 described in connection with Figure 1. A clamping cap 106 is drawn into position against the housing 5 by means of stud bolts 108 and serves to compress the rubber washers forming the sandwiches. Similar to the arrangement described in connection with Figure 1, the inner metal washers of the sandwiches engage the bearing bracket and the outer metal washers engage the housing 5, thus providing an arrangement in which the rubber washers are pre-compressed in an axial direction and can allow shear deflection substantially only radially. Three O-rings 110, 112 and 114 are positioned between the bearing bracket 100 and the housing 5. Radial motion of the right hand end of the bracket 100, after initial compression of the O-rings, is limited by engagement of the annular flanges 115 thereon with the housing 5.

A bearing shaft 116 is inserted in press-fit relation into a longitudinally extending bore within the bearing bracket 100 and held in position therein by means of a bolt 118 the head of which bears against the left-hand end of the bearing bracket 100, as viewed in Figure 2, and which is threaded into the bearing shaft 116.

The inboard or right-hand end of the bearing shaft 116 as viewed in Figure 2 is positioned as closely as possible to the center of gravity of the rotor 22 which is mounted on a rotor mounting sleeve 120. This mounting is provided by means of a heavy local press fit of the rotor over a conically tapered portion 122 of the rotor mounting sleeve in a manner similar to that described in connection with rotor 22 as shown in Figure 1.

A sleeve bearing is positioned between the rotor mounting sleeve 120 and the right-hand end or the inboard end of the bearing shaft 116 and includes an inner steel sleeve 124 adapted to ride over a reduced diameter end portion 126 of the bearing shaft. This end portion of the bearing shaft is preferably provided with a silver-lead surface over which the steel sleeve rides. A bronze sleeve 128 is positioned between the sleeve 124 and the inner surface of a reduced inner diameter portion 130 of the right-hand end or inboard end of the rotor mounting sleeve. Longitudinally extending oil grooves 127 are provided in the sleeve 128 and in the portion 126 of the bearing shaft.

The bearing shaft 116 is provided, at approximately the center of its length, with a square shouldered circumferentially extending flange 132 and the left-hand end of the rotor mounting sleeve 120 is provided with a mating groove, the arrangement providing a thrust collar and outboard bearing assembly for the rotor mounting sleeve 120. Oil grooves, as indicated at 134 and 135, extend in radial directions on either side of the thrust collar receiving channel and extend longitudinally across the base of the channel as indicated at 133.

It should be noted that the sleeve 120 may be formed as an integral part of the rotor 22, and that various arrangements of bushings and oil grooves may be employed in the structures of the inboard and outboard bearing assemblies.

A cup-shaped retainer 137 is threaded onto the left-hand end of the rotor mounting sleeve 120 and the base portion 138 of the cup is provided with a longitudinally extending threaded bore 140 in closely spaced relation with the external surface of a cylindrical member 142 which is mounted on the shaft 116 and is formed with a radially extending baffle 143. The baffle 143 is positioned internally of the cup, i.e., to the right of the base 138 of the cup as viewed in Figure 2. The cup 137 is provided with an array of bores 144 shown in Figure 3 providing in longitudinal section oil grooves 146 as shown in Figure 2.

An oil scoop 148 has its open upper end positioned in the upper portion of the chamber formed within the cup 137 adjacent to the left-hand end of the rotor mounting sleeve 120 as shown in Figure 2. The lower end of the oil scoop 148 communicates with a bore 150 extending longitudinally within the bearing shaft 116. A tube 152 extends from a reduced diameter portion 154 of the internal bore within the bearing shaft 116 toward the left-hand end thereof as viewed in Figure 2, and is provided with an externally threaded enlarged diameter left-hand end portion 156 supported between the radial bores 170 and 171 in the bearing shaft 116 by the threaded bore within the bearing shaft 116.

The lubrication of the bearing may now be considered. Lubricating oil is supplied through an oil inlet passage 158 and flows through passages 160 and 162 in the housing 5 to an annular space 164 between the O-rings 110 and 112. From this space oil flows through a bore 166, an annular space 168 in the bearing bracket 100 and through bore 170 into the bore 150 at the left-hand end of the tube 152. From this space the oil flows through the tube 152 and the bore 154 to the space 172 of the righthand end of the bearing assembly. The oil then flows through the oil grooves 127 in the sleeve 128 and in the reduced diameter end portion 126 of the bearing shaft serving to lubricate the sleeves 128 and 124 of the inboard bearing assembly. These grooves are formed with properly tapered lands so that three separate oil films are maintained. These oil films provide both lubrication and excellent damping and by rapid and minute variations in their thicknesses they permit a displacement of the rotor from its rotation around its geometric axis to rotation around its gravitational axis.

As the oil is discharged from the outboard or left-hand side of the inboard bearing, it is flung outwardly into the cylindrical cavity formed within the rotor mounting sleeve 120 where it is retained in the form of a thin annular layer of oil lying against the inside surface of the rotor mounting sleeve. Thus centrifugal action keeps the oil clear of the stationary shaft 116, squeezes air bubbles out of the oil layer and in this manner also prevents frictional loss from occurring by virtue of drag provided by the oil layer between the stationary shaft 116 and the rotating sleeve 120.

The annular oil layer moves continuously toward the left, as viewed in Figure 2, to the collar 132 which, as previously described, provides both a journal and a thrust being. The oil enters the oil grooves 134 and lubricates successively the radial inboard face of the thrust bearing, the outer peripheral face of the journal bearing and the radial outboard face of the thrust bearing. The grooves 134, 133 and 135 form U-tube passages inverted with reference to the longitudinal center line of the rotating assembly. The inboard legs of these tubes, as indicated at 134, are longer than the outboard legs of the tubes indicated at 135 by virtue of the fact that the inside diameter of the sleeve 120 on the inboard side of the thrust bearing is smaller than the inside diameter of the sleeve on the outboard side of the thrust bearing. Thus by this difference in diameters and resulting difference in lengths of the U-tube legs, centrifugal pumping of the oil is provided through all the bearings. Furthermore, due to the fact that the journal bearing is surrounded by a completely enclosed channel in the rotating sleeve 120, lubrication of the bearing is always assured for the reason that the entire outboard bearing journal is not only always submerged in oil but in oil having very high pressure, i.e., of the order of 200 to 300 p.s.i., as the result of centrifugal forces acting on the oil.

After the oil has passed through the journal bearing at 132, it is flung into the rotating chamber within the cup 137. The scoop 148 extends within the cup chamber and communicates with the bore 150 in the bearing shaft 116 as described. Centrifugal force throws the oil into a rotating annular layer clinging to the maximum inside diameter portions of the chamber within the cup 137. The radial depth of this layer is held constant by the action of the scoop 148 which continuously peels off oil from the inside surfaces of this annular layer. The oil enters the scoop 148 with sufficient velocity to provide ample pressure to cause the oil to flow through the scoop tube and through the annular space within the bore 150 and outside of the tube 152 to the oil discharge passages 171 and 174.

The longitudinally extending threaded bore 140 in the base of the cup is in closely spaced relation with the cylindrical member 142. The flange 143 lies in closely spaced relation to the inside of the base of the cup 137 and this flange in conjunction with the passages 146 in the cup provide a centrifugal pumping effect when the cup is rotated. The threaded bore 140 in the base of the cup 138 provides helical or viscous pumping action due to the close clearance of the threads with the cylindrical member 142. This pumping action serves to drive leakage oil toward the radial flange of the baffle 142 from which it is pumped by the centrifugal pumping action to the annular oil layer. The outside diameter of the radially extending flange 143 of the baffle 142 is selected in conjunction with the position of the scoop 148 so that the baffle just touches the inner surface of the annular oil layer thereby providing a fluid seal.

In Figures 4 and 5 there is shown generally at 176 an alternative form of the oil scoop 148 shown in Figure 2. This alternative form involves a scoop tube 182 having an opening 180 and a smaller scoop tube 184 extending through the wall of the tube 182 and having an opening 178 positioned adjacent to the opening 180.

This arrangement provides, upon the substitution of the scoop tube assembly 176 for the scoop tube 148 shown in Figures 2 and 3, for the handling of oil by the small scoop opening 178 through which oil is injected at high velocity to the interior of the larger scoop tube 182 in such a fashion that an injector action is achieved and thus the larger scoop opening 180 will aspirate oil vapor and stray droplets of oil existing within the annular oil layer. In the event that the radial depth of the rotating annular oil layer in the scoop chamber increases, both scoops are capable of carrying away the surplus oil. This arrangement of twin scoops serves not only to aspirate oil vapor from the scoop chamber but also presents only the relatively small frontal area of the small scoop to the oil layer during normal operation and thus minimizes the disturbance caused by splashing of the oil and drag of the scoop in the annular layer which is rotating at high velocity. At the same time while the discharge area provided by the small scoop is sufficient for normal operation the additional passage area of the large scoop is available if abnormal conditions should occur.

In Figure 6 there is shown in diagrammatic form the turbo-compressor rotor mounting bearing arrangement shown in Figure 2 employing a self-contained lubricating system. The scoop tube scavenging pump is sufficiently effective that it is capable of providing sufficient oil pressure to provide for oil circulation through an oil reservoir and an oil cooler. In Figure 6 there is shown the rotor 22 mounted on the rotor mounting sleeve 120 which rotates on the bearing shaft 116 which is, in turn, supported in the bearing bracket 100 in the manner described in connection with Figure 2. The oil inlet passage 158 receives oil flowing from an oil reservoir 186 through an oil cooler 188 and this oil flow passes successively through the inboard sleeve bearings and the outboard journal bearings as previously described. The oil leaving these bearings enters a scoop tube 148 from which it flows through the various oil conducting passages and the discharge passage 174 to the oil reservoir 186. An air line 190 carries air under pressure from the compressor scroll 192. A check valve 194 is provided to prevent reverse flow of oil from the reservoir 196 into the compressor scroll. This supply of pressurized air raises the pressure of the lubricating system; however, the scoop tube pump is adequate to act against this pressure and to provide for a circulation of oil through the system causing the oil to flow from the annular scoop chamber back into the oil reservoir.

The closed lubrication system described in connection with Figure 6 and the sleeve bearing construction described in connection with Figure 2 provide an improved bearing mounting and lubrication system for the turbo-compressor rotor satisfying the various requirements for such a mounting described above including the assurance of a reliable supply of clean air-free lubricating oil to all the bearings surfaces without there being involved excessive drag resulting from unnecessary oil film contacts and without there being any undesirable oil leakage.

It will be evident that the scoop pump lubricating system will operate only when the rotor is rotating at a fairly high speed, the pressure output of the scoop pump being proportional to the square of the speed of rotation. However, when the rotor speed is low, momentarily during starting, enough residual oil exists in the rotor bearings to provide adequate lubrication.

Figure 7:
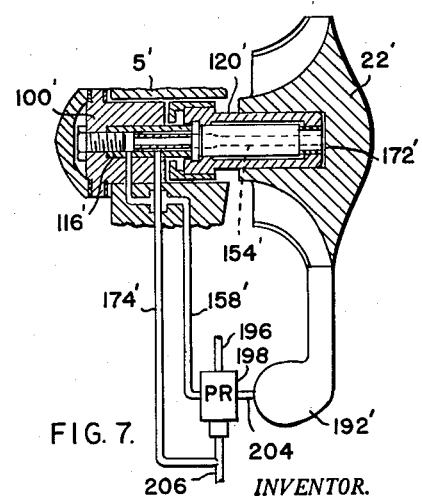
Figure 7 is a diagrammatic representation of an alternative form of lubrication system applied to the form of the invention shown in Figure 2.

In Figure 7 there is shown in diagrammatic form, a turbo-compressor rotor mounting bearing arrangement supplied with lubricating oil from an outside pressure source such as, for example, the lubrication system of an associated internal combustion engine. Lubricating oil from a suitable source is received through a conduit 196 and delivered to a pressure regulator 198. Oil from the pressure regulator 198 is delivered through the conduit 158' to the rotor bearing of a turbocompressor rotor such as that shown in Figure 6 and previously described. Oil discharged from the rotor bearing through conduit 174' and surplus oil delivered to the pressure regulator 198 through the connection 196 is discharged through the connection 206 and returned to the engine lubricating oil system. In order that the pressure regulator may act to prevent the pressure of the lubricating oil delivered through the connection 200 to the rotor bearing assembly from exceeding the compressor discharge pressure a connection 204 is provided between the compressor scroll 192 and the pressure regulator 198.

The pressure regulator 198 referred to in Figure 7 will now be more fully described. This regulator is indicated generally at 198 in Figures 8, 9 and 10. The regulator comprises a body 208 having connected thereto the oil supply line 196, the feed line 200, the air line 204 and the drain line 206 previously described. The drain line is connected to the body 208 through a pressure relief valve 210. This valve may be of any conventional type, and opens when the inlet pressure to the relief valve exceeds a predetermined pressure, for example, 20 p.s.i. Thus, the pressure of the lubricating oil delivering from the body 208 through the line 200 will never exceed 20 p.s.i.

A bore 212 extends through the body 208 between the oil inlet line 196 and the pressure relief valve 210, a bore 214 extends perpendicular to and crosses the bore 212, and a valve member 216 is rigidly connected by a shank 218 to a sliding plug 220 in smooth sliding fit within the bore 214. The right-hand end of the plug 220 as viewed in Figure 8 engages a flexible diaphragm 222 mounted within a chamber 223 in the body 208 and held in position therein by means of a disc 224 retained by a retainer snap ring 226 fitted into a receiving means in the body 208. The air line 204 previously mentioned is threaded into the disc 224 which is bored to provide communication between the air line 204 and the space 205 between the disc 224 and the diaphragm 222.

The valve member 216 extends into a chamber 228 containing a spring 230 positioned between the valve member and a plug 232. The spring urges the valve member to the right as viewed in Figure 8 serving to close off the left-hand end of the bore 214. As will become evident upon viewing Figure 10, the chamber 228 communicates with the oil line 200 and a bore 234 provides communication between the chamber 223 on the left-hand side of the diaphragm 222 as viewed in Figure 10 and the chamber 228.

Figure 8:
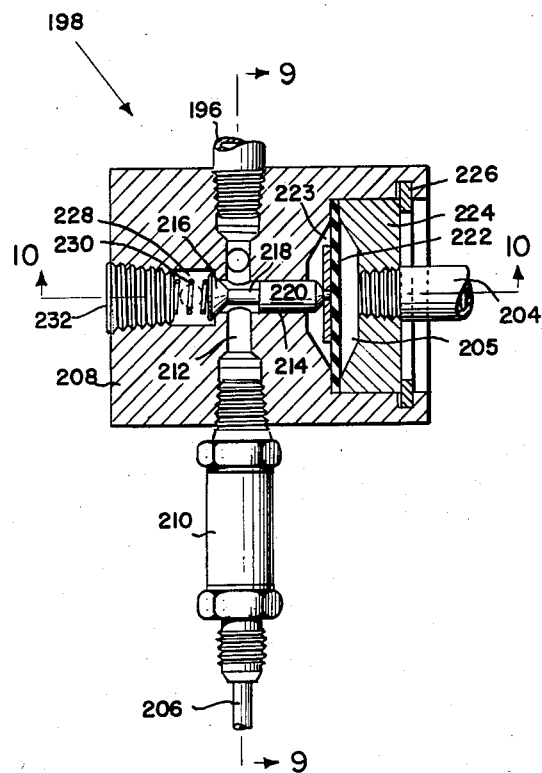
Figure 8 is a longitudinal section through a portion of the apparatus shown in Figure 7.
Figure 9:
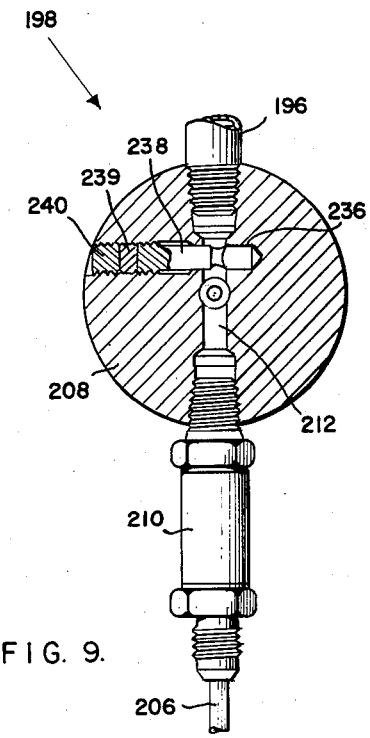
Figure 9 is a vertical section through the apparatus shown in Figure 8 taken on the trace 9—9 thereof.
Figure 10:
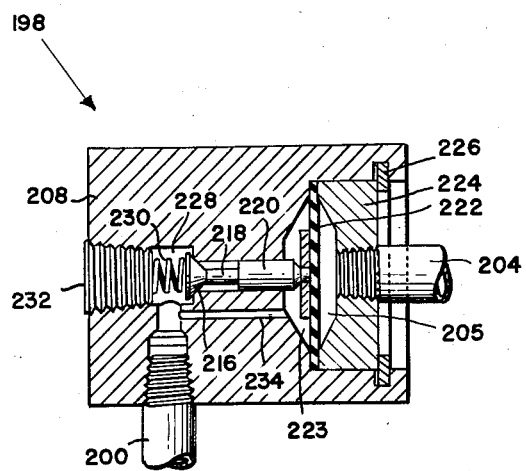
Figure 10 is a horizontal section through the apparatus shown in Figure 8 taken on the trace 10—10 thereof.

A bore 236 extends at right angles to the bores 212 and 214 and intersects the bore 212 above the bore 214 as viewed in Figures 8 and 9. A threaded throttle plug 238 is locked in position in the bore 236 by means of a fiber plug 239 and a threaded plug 240. The throttle plug is positioned to suitably restrict the inlet flow of oil to the pressure regulator.

In operation oil flow entering the conduit 196 will pass the throttle plug 238 to the pressure relief valve, and when the pressure of the oil within the body 208 exceeds 20 p.s.i. the relief valve 210 will open. When the compressor is not operating and has a zero discharge pressure the valve 216 will prevent any flow of oil to the discharge line 200. As the compressor commences operation and begins to build up a discharge pressure, this pressure will appear on the right-hand side of the diaphragm 222 displacing the diaphragm to the left and opening the valve 216 as viewed in Figure 8, whereupon flow will occur to the line 200, and, through the bore 234, the pressure at the left of the diaphragm 212 will be maintained equal to the pressure in the discharge line 200. It will be evident that by proper selection of the diameter of the diaphragm 222 and the force of the spring 230 that the pressure of the oil supplied to the line 200 and to the rotor bearings will never exceed the pressure of the elastic fluid in the compressor discharge.

The self-contained lubricating system shown in Figure 6 and the external source lubricating system shown in Figure 7 are alternatively employed. The self-contained system has the advantage of permitting the use of special oil particularly suited for high-speed operation. Lubrication from an associated combustion engine has the advantage of greater simplicity and, therefore, lower cost.

This application is a continuation in part of my co-pending application Serial No. 520,181, filed July 6, 1955.

What is claimed is:

1. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a body of deformable incompressible material preloaded in a direction extending longitudinally of said shaft and providing shear deflection radially of said shaft giving rise to orbit seeking operation during high speeds of rotation of the rotor.

2. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a body of deformable incompressible material preloaded in a direction extending longitudinally of said shaft and suspending said shaft for displacement in a radial direction.

3. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a body of rubber preloaded in a direction extending longitudinally of said shaft to provide substantial deformation thereof and suspending said shaft for displacement in a radial direction.

4. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising an annular arrangement of deformable incompressible material positioned externally of said shaft and preloaded in a direction extending longitudinally of said shaft and suspending said shaft for displacement in a radial direction.

5. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a radially extending flange, an annular arrangement of deformable incompressible material positioned adjacent to each radial face of said flange, means preloading said material in a direction extending longitudinally of said shaft, said material suspending said flange and shaft for displacement in a radial direction perpendicular to the direction of said preloading.

6. An elastic fluid handling device comprising a rotor having a hub carrying blading, and mounting means for said rotor, said mounting means comprising a substantially stationary shaft, a bearing at least partially located within said hub and supporting the hub on said shaft, and means mounting said shaft and constraining it to move only substantially parallel to itself under stresses imparted to the shaft by said rotor, said shaft mounting means comprising a radially extending flange, an annular arrangement of rubber positioned adjacent to each radial face of said flange, means pre-loading said rubber in a direction extending longitudinally of said shaft to provide substantial deformation thereof, said rubber suspending said flange and shaft for displacement in a radial direction perpendicular to the direction of said preloading.

7. A turbo-compressor comprising a rotor having a hub carrying compressor blading at one axial side thereof and turbine blading at the other axial side thereof, and mounting means for said rotor, said mounting means comprising a substantially stationary shaft, and a bearing assembly at least partially located within said hub at the side thereof carrying the compressor blading and supporting the hub on said shaft, said bearing assembly comprising a sleeve bearing including concentrically arranged relatively movable sleeves mounted on the inboard end of said shaft within said hub and a thrust bearing in the form of a radially extending flange mounted on said shaft spaced from said sleeve bearing.

8. A turbo-compressor comprising a rotor having a hub carrying compressor blading at one axial side thereof and turbine blading at the other axial side thereof, and mounting means for said rotor, said mounting means comprising a housing, a substantially stationary shaft mounted in said housing, and a bearing assembly at least partially located within said hub at the side thereof carrying the compressor blading and supporting the hub on said shaft, said bearing assembly comprising a sleeve bearing having oil grooves therein mounted on said shaft within said hub and a thrust bearing having oil grooves therein mounted on said shaft spaced from said sleeve bearing, and an annular recess in said hub for the flow of an annular layer of oil between said bearings and out of contact with said shaft.

9. A turbo-compressor comprising a rotor having a hub carrying compressor blading at one axial side thereof and turbine blading at the other axial side thereof, and mounting means for said rotor, said mounting means comprising a substantially stationary shaft, a bearing assembly at least partially located within said hub at the side thereof carrying the compressor blading and supporting the hub on said shaft, and means for passing oil through said bearing assembly including means for retaining an annular body of oil rotating with said hub and a stationary scoop assembly including a radially outer scoop opening paring off the radially inner surface of said annular body of oil and delivering it to a scoop passage and including a radially inner scoop opening connecting with said scoop passage and aspirating elastic fluid of oil mist from the space within the annular body of oil.

10. A turbo-compressor comprising a rotor having a hub carrying compressor blading at one axial side thereof and turbine blading at the other axial side thereof, and mounting means for said rotor, said mounting means comprising a substantially stationary shaft, a bearing assembly at least partially located within said hub at the side thereof carrying the compressor blading and supporting the hub on said shaft, said bearing assembly comprising a sleeve bearing having oil grooves therein mounted on said shaft within said hub and a thrust bearing including a radially extending flange mounted on said shaft spaced from said sleeve bearing, said thrust bearing having radially extending oil grooves on each side thereof in said hub joined at their radially outer ends and to dissimilar inside diameters to provide pumping of oil through the bearing when the hub is rotating, an annular recess in said hub for the flow of an annular layer of oil between said bearing and out of contact with said shaft, means for retaining an annular body of oil rotating with said hub, a stationary scoop paring off the radially inner surface of said annular body of oil, and means for conducting oil from said scoop to the ends of the oil grooves in said sleeve bearing away from said hub recess, said oil scoop providing pumping of oil through said oil conducting means.

11. A turbo-compressor comprising a rotor having a hub carrying compressor blading at one axial side thereof and turbine blading at the other axial side thereof, and mounting means for said rotor, said mounting means comprising a substantially stationary shaft, a bearing assembly at least partially located within said hub at the side thereof carrying the compressor blading and supporting the hub on said shaft, means for supplying lubricating oil to said bearing assembly, and sealing means for preventing oil leakage along said shaft from said bearing assembly, said sealing means comprising closely adjacent cylindrical surfaces of said shaft and said rotor, one of which is threaded to provide a viscous pumping of oil upon rotor rotation, and closely adjacent radial flanges on said shaft and rotor providing a narrow space receiving oil from said cylindrical surfaces.

12. A turbo-compressor comprising a rotor including a hub and a sleeve mounting said hub, said hub carrying compressor blading at one axial side thereof and turbine blading at the other axial side thereof, and means mounting said rotor, said mounting means comprising a substantially stationary shaft and a bearing assembly at least partially located within said hub and supporting said sleeve on said shaft, said sleeve having at least a portion of its outer surface of conical form and having a generally radial flange at the base of the cone, and said hub being in press fit relation with said conically formed surface and extending over said radial flange.

13. A turbo-compressor comprising a rotor including a hub and a sleeve mounting said hub, said hub carrying compressor blading at one axial side thereof and turbine blading at the other axial side thereof, and means mounting said rotor, said mounting means comprising a substantially stationary shaft and a bearing assembly at least partially located within said hub and supporting said sleeve on said shaft, said sleeve having at least a portion of the outer surface of conical form and having a generally radial flange at the base of the cone, and said hub having a substantially cylindrical bore in press fit relation with and deformed by said conically formed surface and extending over and indented by said radial flange.

14. A turbo-compressor comprising a rotor having a hub carrying compressor blading at one axial side thereof and turbine blading at the other axial side thereof, and mounting means for said rotor, said mounting means comprising a substantially stationary shaft, a bearing assembly at least partially located within said hub at the side thereof carrying the compressor blading and supporting the rotor on said shaft, and means for supplying oil under pressure to said bearing assembly, said oil supply means including a pressure responsive valve means connected to the compressor air discharge and operative to cut off the supply of oil whenever the oil pressure exceeds that of air discharged from the compressor.

15. A turbo-compressor comprising a rotor having a hub carrying compressor blading at one axial side thereof and turbine blading at the other axial side thereof, and mounting means for said rotor, said mounting means comprising a substantially stationary member, a bearing assembly at least partially located within said hub at the side thereof carrying the compressor blading and supporting the hub on said member, and means for passing oil through said bearing assembly including means for retaining an annular body of oil rotating with said hub and stationary scoop means paring off the radially inner surface of said annular body of oil.

References Cited in the file of this patent

UNITED STATES PATENTS

| | | |
|---|---|---|
| 1,354,129 | Prindle | Sept. 28, 1920 |
| 2,184,197 | Shutte | Dec. 19, 1939 |
| 2,322,824 | Buchi | June 29, 1943 |
| 2,390,506 | Buchi | Dec. 11, 1945 |
| 2,480,095 | Buchi | Aug. 27, 1949 |
| 2,577,179 | Buchi | Dec. 4, 1951 |
| 2,693,149 | White | Mar. 2, 1954 |
| 2,709,893 | Birmann | June 7, 1955 |
| 2,795,371 | Buchi et al. | June 11, 1957 |
| 2,805,819 | Buchi et al. | Sept. 10, 1957 |
| 2,843,311 | Buchi | July 15, 1958 |